(12) United States Patent
Bern et al.

(10) Patent No.: US 7,024,049 B2
(45) Date of Patent: Apr. 4, 2006

(54) METHOD AND APPARATUS FOR IMPROVING IMAGE APPEARANCE

(75) Inventors: Marshall W. Bern, San Carlos, CA (US); David Goldberg, Palo Alto, CA (US)

(73) Assignee: Xerox Corporation, Stamford, CT (US)

( * ) Notice: Subject to any disclaimer, the term of this patent is extended or adjusted under 35 U.S.C. 154(b) by 768 days.

(21) Appl. No.: 10/046,196

(22) Filed: Jan. 16, 2002

(65) Prior Publication Data

US 2003/0133615 A1    Jul. 17, 2003

(51) Int. Cl.
*G06K 9/40* (2006.01)
(52) U.S. Cl. .................... 382/254; 382/228
(58) Field of Classification Search ........... 382/254, 382/228
See application file for complete search history.

(56) References Cited

U.S. PATENT DOCUMENTS

| 5,303,313 | A | 4/1994 | Mark et al. | |
|---|---|---|---|---|
| 5,835,638 | A | 11/1998 | Rucklidge et al. | |
| 6,658,151 | B1 * | 12/2003 | Lee et al. | 382/229 |
| 6,674,900 | B1 * | 1/2004 | Ma et al. | 382/176 |

OTHER PUBLICATIONS

Bern et al. "Scanner-Model_Based Document Image Improvement." Proc. Int. Conf. on Image Processing, vol.2, Sep. 10, 2000, pp. 582-585.*
Hansen et al. "Image Enhancement Using Watershet-Based Maximum Homogeneity Filtering." Proc. Int. Conf. on Image Processing, vol. 1, Oct. 23, 1995, pp. 482-485.*
Digipaper, http://www3.cs.cornell.edu/digipaper/.
John D. Hobby et al., "Degraded Character Image Restoration", Proc. 5th Annual Symp. On Document Analysis and Image Retrieval, pps. 177-189, 1996.
John D. Hobby et al., "Enhancing Degraded Document Images via Bitmap Clustering and Averaging", ICDAR '97: Fourt Int. Conference on Document Analysis and Recognition, 1997.

* cited by examiner

*Primary Examiner*—Jingge Wu
*Assistant Examiner*—Colin LaRose
(74) *Attorney, Agent, or Firm*—Oliff & Berridge, PLC

(57) ABSTRACT

Connected components of dark pixels are clustered from across the image. A "most likely" representative image for each cluster of images is determined, with likelihood determined by a probabilistic model of the image capturing process. An a priori (prior) probability distributions on bitmaps may be used to determine the most likely representative images. For example, a priori probability distributions based on so-called chain codes are implemented. The representative images are used to cluster connected components. Clustering may be repeated. The output page is assembled by replacing each member of a cluster of images by that cluster's representative image.

30 Claims, 6 Drawing Sheets on equations ⁊ on equations   on equations
ng of particul: ng of particul: ng of particul:
d the Church  d the Church   d the Church

FIG. 8 where's the beef   where's the beef   where's the beef
y about NT 5.0 is  y about NT 5.0 is  y about NT 5.0 is
: a drop shadow ε  . a drop shadow ε   a drop shadow ε
:ade-in and -out   `ade-in and -out   `ade-in and -out

FIG. 9 might not t : might not t : might not t
it if Micros ut if Micros ut if Micros
ite threat to ate threat to ⁷ ate threat to ⁷

FIG. 10

: might not t : might not t : might not t
ut if Micros ut if Micros ut if Micros
ate threat to ⁷ ate threat to ⁷ ate threat to ⁷

FIG. 11

METHOD AND APPARATUS FOR IMPROVING IMAGE APPEARANCE

BACKGROUND OF THE INVENTION

1. Field of Invention

This invention relates to systems and methods for improving the appearance of captured images.

1. Description of Related Art

In the digital reproduction of documents, a bitmap is created which may be described as an electronic image with discrete signals, i.e. pixels, defined by a position and a density. In conventional image capture devices, such as facsimile and scanner devices, image degradation of captured bilevel image data often occurs. This degradation, such as lower resolution, noise, change in contrast and the like, is well within the visual acuity of the human eye. If the captured image data is output to a recording medium without adjusting for the degradation, the outputted image will include the degradation. Even though such bilevel images are usually readable, they are often difficult or unpleasant to read. Such images are also not presentable for formal purposes. This is because the human eye can sense this image degradation, and the perceived quality of the resulting image suffers greatly even for small degradation.

Various attempts at remedying such problems have been performed. An example is U.S. Pat. No. 5,303,313 to Mark et al., which provides a method of image enhancement through use of a compressed representative image. Another example is described in J.D. Hobby et al., "Enhancing degraded document images via bitmap clustering and averaging," ICDAR '97: *Fourth Int. Conference on Document Analysis and Recognition,* 1997. Both U.S. Pat. No. 5,303,313 and the Hobby article provides a basic strategy. In Hobby, the strategy includes: clustering bitmaps, computing representatives for each cluster, and then assembling an output. For initial clustering, Hobby uses a feature-based approach. To compute cluster representatives, Hobby uses a method that aligns the scans by centroids of black pixels, sums the scans to give a histogram, smooths the histogram to give a gray-level representative, and determines a polygonal outline that stays within a certain gray "tube" yet has a minimum number of inflection points. This computation method is described in J.D. Hobby and H.S. Baird, "Degraded Character Image Restoration", *Proc. 5th Annual Symp. On Document Analysis and Image Retrieval,* 1996, pps. 177–189. To align and form the assembled output, Hobby appears to use the alignment computed when computing cluster representatives. U.S. Pat. No. 5,303,313 does not perform any reclustering, and instead is concerned primarily with compression.

While the Hobby method shows some improvement in images and increases resolution, there are many refinements that can be made.

SUMMARY OF THE INVENTION

Methods and systems of this invention improve the appearance of a captured bilevel image to enable better reading and improved downstream processing, such as deskewing or optical character recognition (OCR).

The methods and systems of this invention separately reduce image degradation that appear in the captured bilevel image.

This invention separately provides systems and methods for printing images that reduce image degradation introduced during image capturing to provide a printed image with improved appearance.

This invention separately provides systems and methods that have more reliable initial clustering, a reduction of clusters without introducing any significant decrease in image quality, super-resolved placement of representatives, and other image enhancement including breaking-up of run-together letters of text.

In various exemplary embodiments of the methods and systems according to this invention, the output image may have higher resolution than the input image.

In various exemplary embodiments of the methods and systems according to this invention, a bitmap representation of a captured image is clustered into a plurality of clusters, representatives of the clusters are determined, the bitmap may then be reclustered, and then an output image is assembled.

In various exemplary embodiments of the methods and system according to this invention, connected components of dark pixels are clustered from across the image, and a "most likely" representative image for each cluster of images is determined, with likelihood determined by a probabilistic model of the image capturing process. The representative images are themselves bitmaps. In various exemplary embodiments, the representative images are at higher resolution. These representative images may be reclustered and finally assembled in an output page by replacing each member of a cluster by the cluster's representative.

In various exemplary embodiments of the methods and systems according to this invention, initial clustering uses a Hausdorff matching algorithm.

In various exemplary embodiments of the methods and systems according to this invention, cluster representations are determined by using a hill-climbing optimization procedure to approximate the most probable higher resolution representative. This has the advantage that it can rigorously incorporate Bayesian priors and learned or guessed scanner distortion parameters resulting in more accurate sharp features and reliable overall blackness. However, other optimization procedures can be substituted.

In various exemplary embodiments of the methods and systems according to this invention, reclustering combines or eliminates clusters but does not split clusters, thus reducing the total number of clusters.

In various exemplary embodiments of the methods and systems according to this invention, the assembly places representatives in their likeliest positions.

In various exemplary embodiments of the methods and system according to this invention, a priori (prior) probability distributions on bitmaps are used to determine the most likely representative images.

In various exemplary embodiments of the methods and system according to this invention, a priori probability distributions based on so-called chain codes may be implemented. The methods and systems of this invention then use the representative images to recluster connected components, and finally to assemble the output page by replacing each member of a cluster of images by that cluster's representative image. Thus, the degradation is reduced or eliminated, and an improved bilevel image is obtained.

In various exemplary embodiments of the methods and systems of the invention, improved deskewing and optical character recognition (OCR) with improved accuracy can be attained.

These and other features and advantages of this invention are described in or are apparent from the following detailed description of various exemplary embodiments.

BRIEF DESCRIPTION OF THE DRAWINGS

Various exemplary embodiments of this invention will be described in detail, with reference to the following figures, in which:

FIG. 8 shows a comparison of text from a fine 200 dpi fax input, image enhancement using a known method, and image enhancement according to the invention;

FIG. 9 shows details of a flatbed scanner input, the input lightened, and the input darkened;

FIG. 10 shows details of a fax input, the fax input after 1 round of pixel flipping according to the invention, and after 4 rounds of pixel flipping according to the invention; and FIG. 11 shows details of the fax input of FIG. 10 after 4 rounds of pixel flipping using priors, after reclustering, and after breaking up run-together letters.

DETAILED DESCRIPTION OF PREFERRED EMBODIMENTS

Various exemplary embodiments of the invention will be described, each of which can provide image improvement to captured images. In these various embodiments, connected components from across one or more pages of a captured bilevel image are clustered and a "most likely" representative for each cluster is computed by a probabilistic model of the scanning process. Representative images are themselves bitmaps, but may be at a higher resolution. These representations are then used to re-cluster connected components. An output image is then assembled by replacing each family member of a cluster by the cluster's representative.

Figure 1:
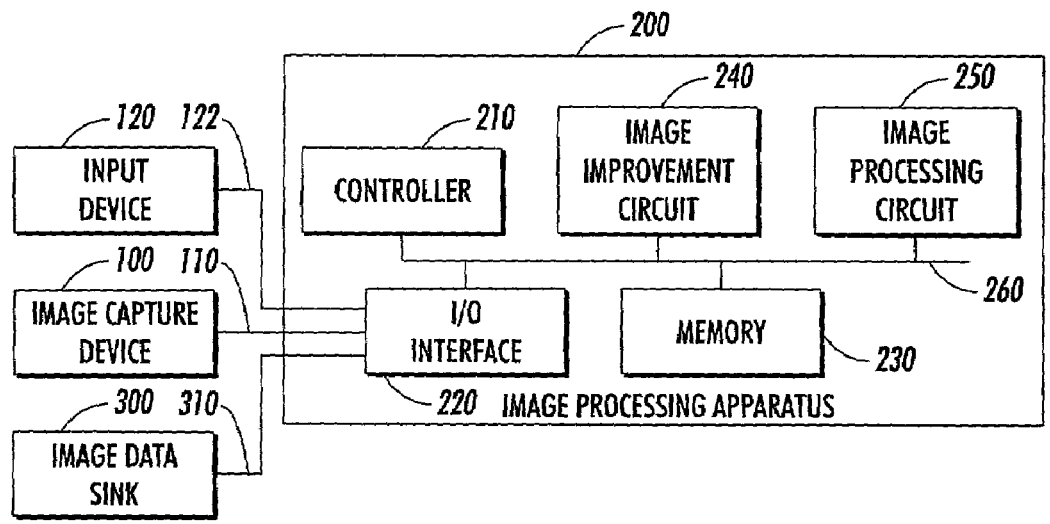
FIG. 1 shows one exemplary embodiment of a system that includes an image processing apparatus and the image capture device according to this invention.

The invention may be implemented on the exemplary system shown in FIG. 1. As shown in FIG. 1, an image capture device 100 and an input device 120 are connected to an image processing apparatus 200 over links 110 and 122, respectively. Similarly, an image data sink 300 can be connected to the image processing apparatus 200 over a link 310.

The image capture device 100 can be a digital camera, a scanner, a facsimile machine, a digital copier, or any other known or later developed device that is capable of capturing an image and generating electronic image data that has been captured according to the image capture techniques described above. Similarly, the image capture device 100 can be any suitable device that stores and/or transmits electronic image data such as a client or a server of a network that has been captured according to the image capture techniques described above.

The image capture device 100 can be integrated with the image processing apparatus 200, as in a digital copier or a facsimile machine having an integrated scanner. Alternatively, the image capture device 100 can be connected to the image processing apparatus 200 over a connection device, such as a modem, a local area network, a wide area network, an intranet, the Internet, any other distributed processing network, or any other known or later developed connection device.

It should also be appreciated that, while the electronic image data can be generated at the time of printing an image from electronic image data, the electronic image data could have been generated at any time in the past. The image capture device 100 is thus any known or later developed device that is capable of supplying electronic image data that has been captured according to the image capture techniques described above over the link 110 to the image processing apparatus 200. The link 110 can thus be any known or later developed system or device for transmitting the electronic image data from the image capture device 100 to the image processing apparatus 200. Non-limiting examples include a direct cable connection, a connection over a wide area network or a local area network, a connection over an intranet, a connection over the Internet, or a connection over any other distributed processing network or system. In general, the link 110 can be any known or later developed connection system or structure usable for connection between two components to transmit data.

The input device 120 can be any known or later developed device for providing control information from a user to the image processing apparatus 200. Thus, the input device 120 can be a control panel of the image processing apparatus 200, or a control program executing on a locally or remotely located general purpose computer or the like. As with the link 110 described above, link 122 can be any known or later developed device for transmitting control signals and data input using the input device 120 from the input device 120 to the image processing apparatus 200.

The image data sink 300 can be any known or later developed device that can receive the reconstructed composite image from the image processing apparatus 200. Thus, the image data sink 300 can be a display, an image data sink such as a laser printer, a digital copier, an inkjet printer, a dot matrix printer, a dye sublimation printer, or the like. The image data sink 300 can also be any known or later developed storage device, such as a floppy disk and drive, a hard disk and drive, a writeable CD-ROM or DVD disk and drive, flash memory, or the like. It should also be appreciated that the image data sink 300 can be located locally to the image processing apparatus 200 or can be located remotely from the image processing apparatus 200. Thus, like the links 110 and 122, link 310 can be any known or later developed connection system or structure usable to connect the image processing apparatus 200 to the image data sink 300. Specifically, the link 310 can be implemented using any of the devices or systems described above with respect to links 110 and 122.

In general, the image data sink 300 can be any known or later developed device that is capable of receiving data output by the image processing apparatus 200 and either storing, transmitting or displaying the data. Thus, the image data sink 300 can be either or both of a channel device for transmitting the data for printing, display or storage or a storage device for indefinitely storing the data until there arises a need to print, display or further transmit the data.

If data sink 300 is a channel device, it can be any known structure or apparatus for transmitting data from the image processing apparatus 200 to a physically remote storage or display device. Thus, the channel device can be a public switched telephone network, a local or wide area network, an intranet, the Internet, a wireless transmission channel, any other distributing network, or the like. Similarly, the storage device can be any known structural apparatus for indefinitely storing image data such as a RAM, a hard drive and disk, a floppy drive and disk, an optical drive and disk, a flash memory or the like. For example, the image data sink 300 may be a printer, a facsimile machine, a digital copier, a display, a host computer, a remotely located computer, or the like.

As shown in FIG. 1, the image processing apparatus 200 includes a controller 210, an input/output interface 220, a memory 230, an image improvement circuit or routine 240 and an image processing circuit or routine 250, each of which is interconnected by a control and/or data bus 260. The links 110, 122 and 310 from the image capture device 100, the input device 120, and the image data sink 300, respectively, are connected to the input/output interface 220. The electronic image data from the image capture device 100 and any control and/or data signals from the input device 120 are input through the input interface, and, under control of the controller 210, are stored in the memory 230.

The memory 230 preferably has at least an alterable portion and may include a fixed portion. The alterable portion of the memory 230 can be implemented using static or dynamic RAM, a floppy disk and disk drive, a hard drive, flash memory, or any other known or later developed alterable volatile or non-volatile memory device. If the memory includes a fixed portion, the fixed portion can be implemented using a ROM, a PROM, an EPROM, and EEPROM, a CD-ROM and disk drive, a writable optical disk and disk drive, or any other known or later developed fixed memory device.

The image improvement circuit 240 inputs signals received from the image capture device 100. The image improvement circuit 240 then outputs image improvement data, which can have a higher resolution than the originally received image data corresponding to the original document, to the image processing circuit or routine 250. The image processing circuit or routine 250 adjusts the captured image data to generate improved image data from the originally received image data, based on the image improvement data from the image improvement circuit or routine 240.

The processed image data is outputted from the image processing apparatus 200 to the image data sink 300 over the link 310. The image processing circuit 250 can also process the improved image data to apply any other known or later developed image processing technique. Accordingly, when the improved image data is output to the image data sink 300, the resulting image can contain any additional known or later developed image enhancements.

The image processing apparatus 200 shown in FIG. 1 is connected to the image data sink 300 over the link 310. Alternatively, image data sink 300 may be an image output terminal that is integral part of the image processing apparatus 200. An example of this configuration would be a digital copier or the like. It should be appreciated that the image processing apparatus 200 can be any known or later developed type of image processing apparatus. There is no restriction on the form the image processing apparatus 200 can take.

As indicated above, the image data sink 300 may be an integrated device with the image processing apparatus 200, such as a digital copier, computer with a built-in printer, or any other integrated device that is capable of producing a hard copy image output. However, as another example, the image processing apparatus 200 and the image data sink 300 may be physically separate, such as a computer memory and a printer.

After being processed by the image processing apparatus 200, the image data is output to the image data sink 300. The data may be stored in the memory before, during and/or after processing by the image processing apparatus 200, as necessary.

It should be understood that various components of the image processing apparatus 200 shown in FIG. 1, such as the image improvement circuit or routine 240, the image processing circuit or routine 250, and the controller 210, can each be implemented as software executed on a suitably programmed general purpose computer, a special purpose computer, a microprocessor or the like. In this case, these components can be implemented as one or more routines embedded in a printer driver, as resources residing on a server, or the like. Alternatively, these components can be implemented as physically distinct hardware circuits within an ASIC, or using an FPGA, a PDL, a PLA, or a PAL, or using discrete logic elements or discrete circuit elements. The particular form each of the components shown in FIG. 1 will take is a design choice and will be obvious and predictable to those skilled in the art.

In one exemplary embodiment of this invention, the image improvement circuit or routine 240 is able to initially cluster portions of the bitmap of the received image data. From this data, the image improvement circuit or routine 240 determines the representative images for each of the clusters. Initial clustering is preferably attained using a Hausdorff matching method. A suitable example of such can be found in U.S. Pat. No. 5,835,638 to Rucklidge et al., the disclosure of which is incorporated herein by reference in its entirety. See also the DigiPaper article. Other methods of initial clustering are known and could be substituted. An exemplary other known method of determining the initial clustering is described in J.D. Hobby et al., "Enhancing degraded document images via bitmap clustering and averaging," ICDAR '97: Fourth Int. Conference on Document Analysis and Recognition, 1997. However, this latter method may be less reliable.

Figure 2:
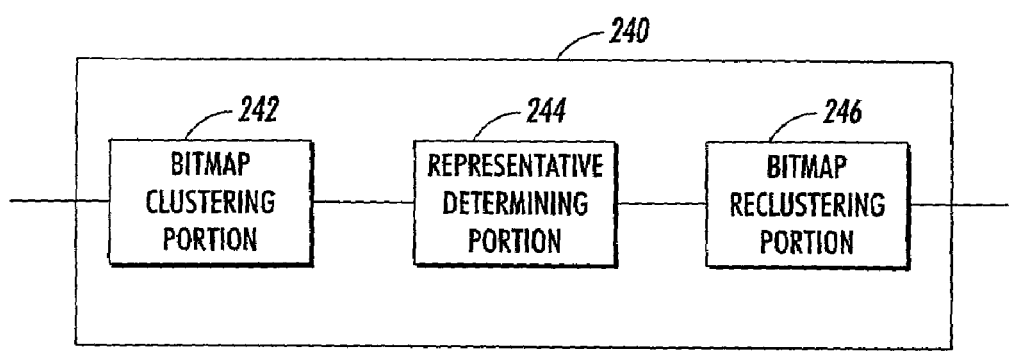
FIG. 2 shows one exemplary embodiment of the image improvement circuit or routine of FIG. 1.

FIG. 2 shows one exemplary embodiment of the image improvement circuit or routine of this invention. As shown in FIG. 2, in the image improvement circuit or routine 240, image data is input to a bitmap clustering portion 242. In the bitmap clustering portion 242, portions of the bitmap of the received image data are initially clustered and the clustered data is input to a representative determining portion 244. From this data, the representative determining portion 244 determines representative images for each of the clusters. In a bitmap reclustering portion 246, the bitmap is then reclustered. Then, the bitmap is reassembled by replacing each member of a cluster by the representative for that cluster.

The reclustered bitmap is output to the image processing circuit or routine 250. The image processing circuit or routine 250 then assembles an improved version of a captured document from this determination with a higher resolution or improved appearance.

Figure 3:
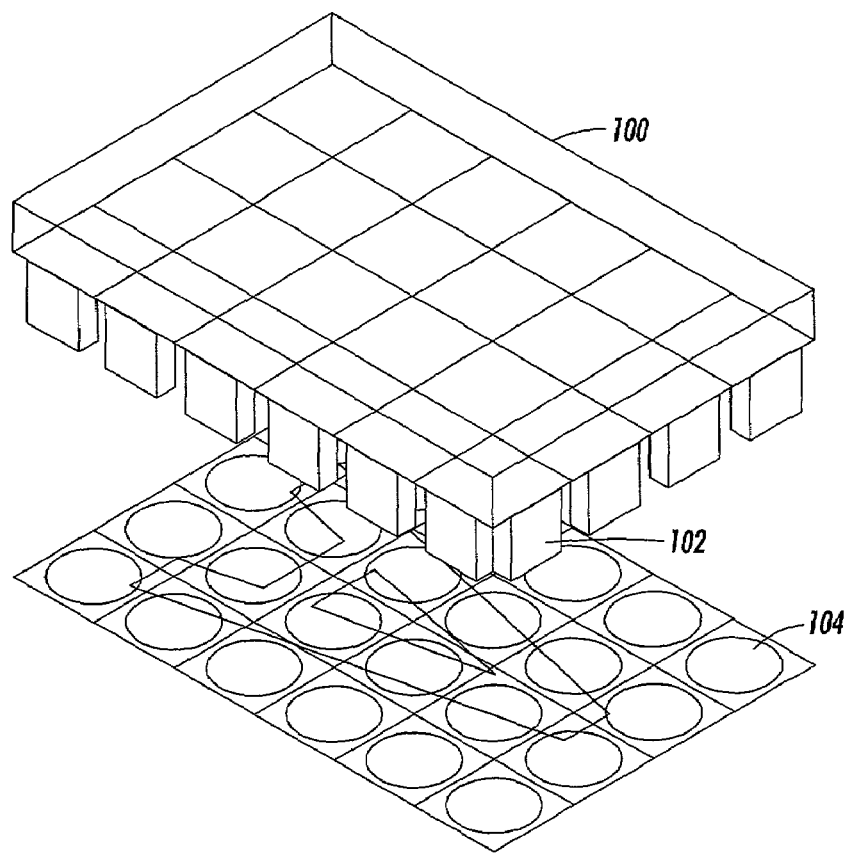
FIG. 3 shows one exemplary embodiment of the image capture device of FIG. 1.

FIG. 3 shows one exemplary embodiment of the image capture device of this invention. As shown in FIG. 3, the image capture device 100 includes a rectangular grid of point sensors 102 that sample an original image. The outputs of the sensors 102 are black and white (or dark and light) pixels.

In this exemplary embodiment, each sensor 102 detects a roughly disk-shaped region 104 of the original image and outputs a white or black pixel based on the sensed image density of the detected region of the scanned document. In general, the likelihood that a particular sensor 102 will output a black pixel is probabilistically dependent upon the total weight of black in the detected region. Although each sensor 102 is preferably positioned at the center of the pixel, it should be appreciated that the sensors 102 may be positioned at the corners rather than at the centers of the input pixels, and hence a point spread function can have four center coefficients.

Figure 4:
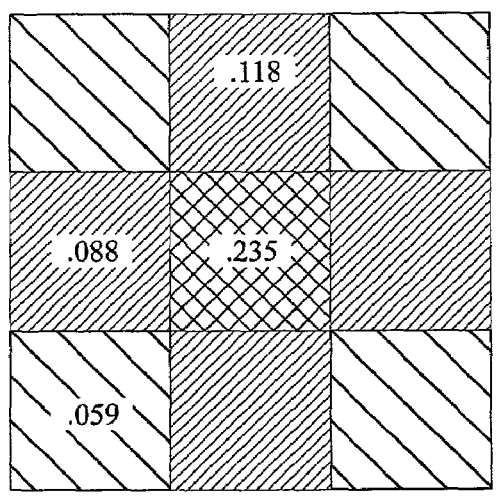
FIG. 4 illustrates an example of the default point spread function of a sensor shown in FIG. 3.
Figure 5:
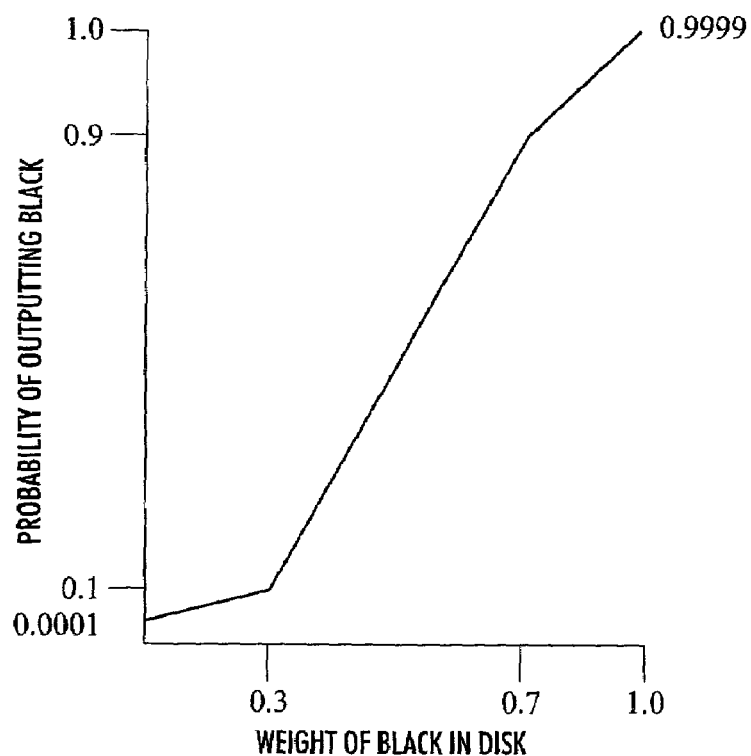
FIG. 5 illustrates an example of the probability curve as a sigmoidal function of the weight of input black of the sensor shown in FIG. 3.

The coefficients for the pixels within the disk-shaped region define a point spread function of the sensors 102. A curve showing the probability that an output pixel of a sensor 102 is black defines the response function of that sensor 102. FIG. 4 shows one exemplary point spread function of a sensor 102. FIG. 5 shows one exemplary probability curve of a sensor 102. In this example, the probability curve is a sigmoidal function of the weight of input black.

The response function can be varied to model different threshold settings for the image capturing device 100. As shown in FIG. 5, a sigmoid symmetric around 0.5 implies no gain for the image capturing device. That is, the expected amount of output black equals the amount of input black. As shown in FIG. 5, a sharp sigmoid upward slope between 0.2 and 0.6 models an image capturing device with some gain.

If optical characteristics of the sensors 102 are known or can be inferred, then the point spread and response functions can be set specifically for a given input image. Alternatively, a user can control the point spread and response functions using the input device 120.

The bitmap clustering portion 242 of the image improvement circuit or routine 240 initially clusters the portions of the received bitmap image into a plurality of clusters of portions, using Hausdorff matching. The representative determining portion 244 determines the representative images for the clusters. The bitmap reclustering portion 246 then reclusters the received bitmap image using the scanner model which contains the point spread function and probability curve of sensors 102. The image processing circuit or routine 250 assembles the output image using the reclustered bitmap from the image improvement circuit or routine 240.

In particular, the "portions" are connected components of black pixels, and are clustered from across the image as discussed above, preferably using a Hausdorff matching algorithm. A connected component is an island of dark (black in the case of a binary black/white image) pixels in a binary scan of a document. That is, a set of dark pixels connected diagonally or orthogonally and surrounded by white. A "most likely" representative image for each cluster of portions is then determined. In various exemplary embodiments, the likelihood of the "most likely" representative image is determined by a probabilistic model of the image capturing process. An approximate most likely representative can be discovered by a hill-climbing optimization procedure. The representative images are themselves bitmaps, with representative bitmaps being at higher resolution than the underlying received image data.

In one exemplary embodiment of the methods and systems according to this invention, the representative determining portion 244 of the image improvement circuit or routine 240 uses an a priori (prior) probability distribution on the bitmap portions to determine the most likely representative image of each cluster of portions. The a priori probability distribution is based on "chain codes". A "chain code" is a sequence of North, South, East and West directions taken while traversing the boundary of a connected component. For more information on chain codes, U.S. Pat. No. 6,690.821 to Goldberg et al., the subject matter of which is incorporated herein in its entirety.

The bitmap reclustering portion 246 of the image improvement circuit or routine 240 then uses the representative images to recluster the portions, such as the connected components. The image processing circuit or routine 250 assembles the output page by replacing each member of a cluster by that cluster's representative. Thus, for example, image degradation is reduced or eliminated, and an improved bilevel image may be obtained.

Figure 6:
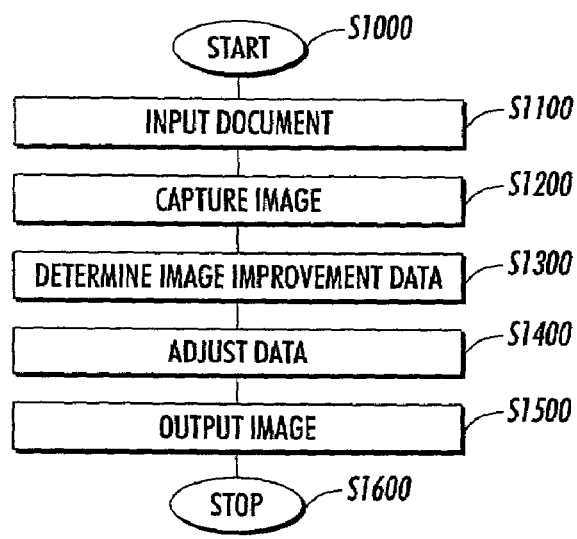
FIG. 6 is a flowchart outlining one exemplary embodiment of a method for processing an image according to this invention.

FIG. 6 is a flowchart outlining one exemplary embodiment of an image processing method according to this invention. Beginning at step S1000, control advances to step S1100, where the document is input. Then, in step S1200, an image of the document is captured. Next, in step S1300, image improvement data is determined based on the captured image. Control then advances to step S1400. In step S1400, the captured image data is adjusted to provide the improved image data. Next, in step S1500, the adjusted image data image is output as output data. Then, in step S1600, the process stops.

Figure 7:
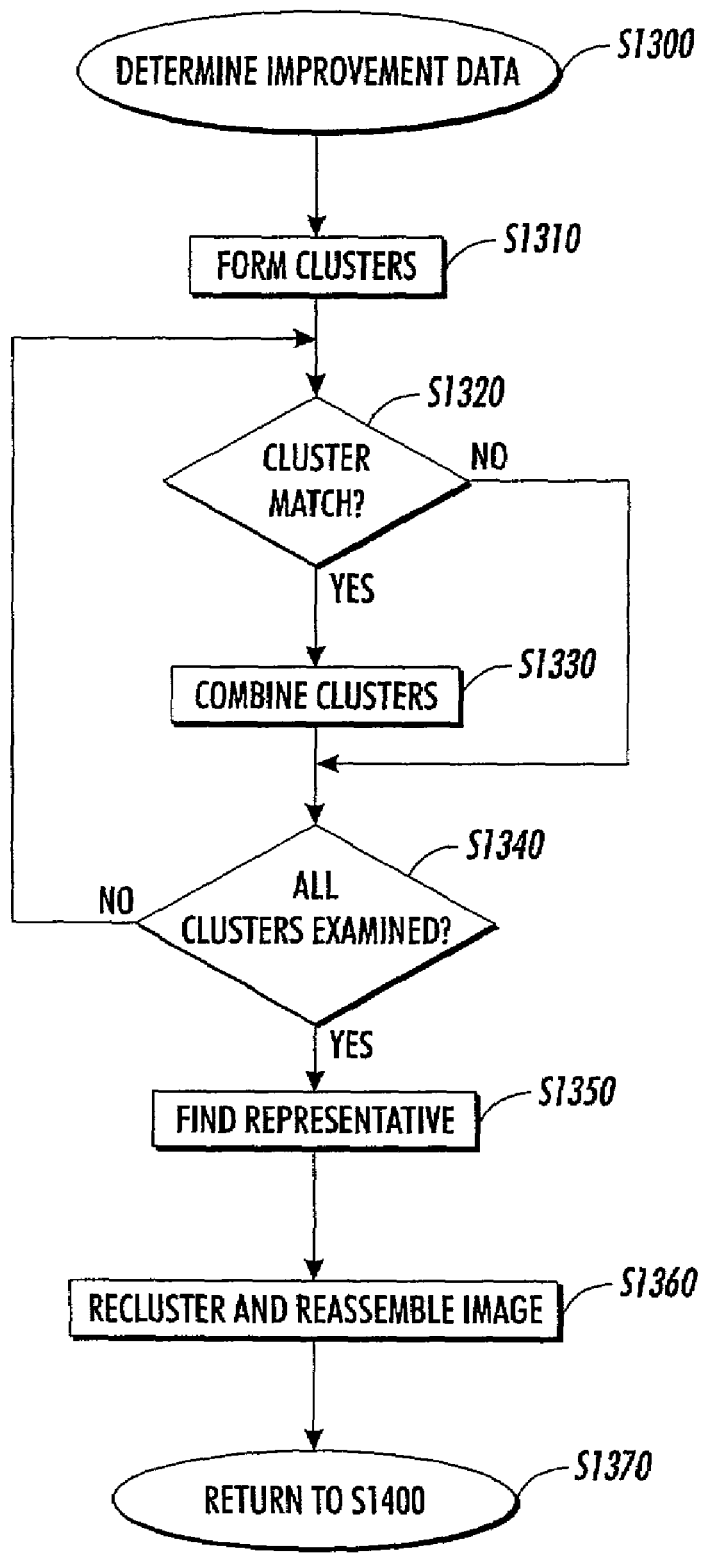
FIG. 7 is a flowchart outlining one exemplary embodiment of the image improvement data determining step of FIG. 6.

FIG. 7 is a flowchart outlining one exemplary embodiment of the image improvement data determination step S1300. Beginning in step S1300, control advances to step S1310, where adjacent pixels are analyzed to determine connected components and to define each connected component as a cluster. Then, in step S1320, the clusters are pair-wise compared to determine if a match is found. If a match is found, control continues to step S1330. Otherwise, the clusters do not match, and control jumps to step S1340.

In step S1330, the matched clusters are combined into a corresponding cluster. Next, in step S1340, it is determined whether all clusters have been analyzed. If not, flow returns to step S1320. If all have been analyzed, flow advances to step S1350 where a representative image for each cluster is found. Then, in step S1360, reclustering and image reassembling is performed by replacing each of the members of a cluster with that cluster's representative image. Control then advances to step S1370, where control returns to step S1400.

A more detailed explanation of the invention will now be described. As described previously, the inventive methods and systems for performing image improvement include the process steps of: 1) initial clustering; 2) finding representatives; 3) reclustering; and 4) assembling the output. Each will be described in detail below.

As shown in FIG. 1, and previously discussed, the image processing apparatus 200 is preferably implemented on a programmed general purpose computer. However, the image processing apparatus 200 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the four basic process steps or the flowcharts shown in FIGS. 6 and 7, can be used to implement the image processing apparatus 200.

A. Initial Clustering:

When the portions of the received image are implemented as connected components, initial clustering is performed by connecting each black pixel in the captured image to an adjacent black pixel. A connected component is a maximal set of black pixels in the initial binary raster, such that each black pixel is connected to each other by a path of adjacent black pixels. In various exemplary embodiments, the adjacent pixel can include a diagonally adjacent pixel. As such, each pixel may have a total of 8 neighbors.

In one exemplary embodiment, matching is used to form family members for the clusters. In matching, initially, each connected component is in a cluster of its own and thus is that cluster's representative image. Clusters are then combined by finding matching representative images. As the cluster membership changes, either by combining clusters or by dropping members that no longer match the representative image, cluster representative images are redetermined by thresholding aligned histograms. In various exemplary embodiments, the threshold can be set to preserve median blackness.

For any two connected components A and B, a bounding box is just formed around each connected component A and B. Then, the connected components A and B are aligned to each other by aligning the centers of their bounding boxes. The connected components A and B will match each other if:

$$||A|-|A \cap \overline{B}|| \leq f(|\partial A|) \text{ and } ||B|-|B \cap \overline{A}|| \leq f(|\partial B|)$$

where:
- $|A|$ denotes the number of black pixels in A;
- $A \cap B$ denotes the pixels that are black in both A and B;
- $\overline{A}$ denotes a one-pixel dilation of the black pixels in A;
- $\leftarrow A$ denotes the boundary of A, that is, the set of black pixels with white neighbors; and
- $f(n)$ equals 0 for $n \leq 3$, and $0.025n$ for $n \geq 7$, and interpolates between these two lines for $3<n<7$.

A dilation of the black pixels in A is the component that has a black pixel wherever A has either a black pixel or a white pixel orthogonally bordering a black pixel. For example, a topology-preserving dilation is used, which refuses to blacken a pixel if it would join two connected components in its 8-neighborhood.

In other words, for A and B to match, the number of pixels of A lying outside B must be very small, and vice versa. In various exemplary embodiments, an additional test can be used to stop a match if either $A\setminus\overline{B}$ or $B\setminus\overline{A}$ includes a set of more than three black pixels that can be enclosed by a 3×3 box.

Generally, this initial clustering using the Hausdorff method uses a distance measuring technique that is a measure for comparing point sets that can be used to compare binary images. Further details of initial clustering using this Hausdorff matching method can be found in U.S. Pat. No. 5,835,638 to Rucklidge et al. and the DigiPaper article, the disclosures of which are incorporated herein by reference in their entirety.

B. Finding Representatives:

Using the connected components, optimal representative images of the clusters are determined. Briefly, this is determined by a hill-climbing approach. However, before optimal representatives can be better explained, it first must be explained how to compute the probability that a given connected component A is a scan of a given original image B. τ represents a translation of the scanner's sensor grid with respect to B. $w_{ij}(\tau)$ denotes the weight of black in B as seen by the sensor in row I and column j. Using the exemplary point spread and response functions given in FIG. 4 (or other known point spread for a particular sensor), the probability $p(w_{ij}(\tau))$ that the sensor's output pixel will be black can be computed. The probability that the pixel in row i and column j has value $A_{ij}$ (black or white) given B and τ is determined as:

$$P[A_{ij}|B, \tau] = \begin{cases} p(w_{ij}(\tau)) & \text{if } A_{ij} \text{ is black;} \\ 1 - p(w_{ij}(\tau)) & \text{if } A_{ij} \text{ is white.} \end{cases} \quad (1)$$

where:
- τ represents a translation of the sensor grid with respect to the given original image region B;
- $w_{ij}(\tau)$ denotes the weight of black in the given original image region B seen by the sensor in row i and column j; and
- $p(w_{ij}(\tau))$ denotes the determined probability that the sensor's output pixel would be black.

In one exemplary embodiment, the sensors 102 act independently. That is, the randomization of the response function is independent from sensor to sensor. Thus, the individual pixel probabilities can be multiplied to give the probability $P[A|B,\tau]$ that the connected component A is a capture of the given original image region B at translation τ as:

$$P[A|B, \tau] = \prod_{ij} P[A_{ij}|B, \tau]. \quad (2)$$

The connected component A and the given original image region B are each padded with white pixels, and indices i and j run over all positions in the union of the bounding boxes of the connected component A and the given original image region B.

The above equations (1) and (2) assume a specific translations. However, since τ is unknown, τ can be optimized over all possible translations as:

$$P[A|B] = \max_\tau P[A|B, \tau]. \quad (3)$$

While this may involve a difficult optimization problem, if the connected component A and the given original image region B have been pre-aligned by the centroids of their bounding boxes, then the determination may be limited to the nine shortest vectors in this lattice. That is, the determination may be limited to a shift of −1, 0, or 1 in each of the x- and y-coordinates.

The probability of an entire cluster of bitmaps C is determined by multiplying the probabilities of each individual bitmap. Since probabilities become very small, logarithms are added as:

$$P[C|B] = \prod_{A \in C} P[A|B]. \quad (4)$$

The optimal representative image of the given original image region B for a cluster C is the one that maximizes P[C|B]. This is represented as:

$$P[B|C] = P[C|B] \cdot \frac{P[B]}{P[C]} \quad (5)$$

Probability P[B] is the a priori probability of the image of the given representative original image region B, which is assumed to be the same for all given original image regions B, and P[C] is the a priori probability of the cluster C, which is constant.

To find the B that maximizes P[C|B], a hill-climbing approach is preferably used. The initial representative image $B^0$ of the original image region B is simply the cluster representative image with each pixel split into four double-resolution pixels. For each captured connected component A in the cluster, the translation τ for P[A|B$^0$, τ] is determined by searching the 9 shortest vectors as above. Next, P[C|B$^0$] is determined and recorded. The translated image capture is summed to form a double-resolution histogram, which is used to guide the search for the representative. Pixels in the initial representative image B$^0$ are flipped. That is, pixels in the initial representative image B$^0$ are changed from white to black or vice versa, based on this histogram.

To determine the next representative image B$^1$, only the most clearly indicated flips are used. Specifically, in various exemplary embodiments, only these white pixels are flipped where, for example, more than 60% of the captured connected component have black pixels at the corresponding location and these black pixels are flipped where fewer than 40% of the captured connected component have white pixels at the corresponding location. Image capture with respect to B$^1$ is then aligned, P[C|B$^1$] is determined and recorded, and the histogram is updated.

For the next representative image B$^2$, flipping is a little more aggressive, with white pixels over 55%, for example, and black pixels under 45% being flipped, and the alignment and updating cycle are repeated. For the next representative image B$^3$ and subsequent representatives, pixels are flipped according to the expected number in the corresponding histogram bin, rather than by fixed percentages. If the observed number exceeds the number predicted by the scanner model by more than a certain percentage or number, a white pixel is flipped to black, and vice versa. The process is halted either when no pixels flip or after a fixed number of cycles. In various exemplary embodiments, the process is halted after four cycles. The representative image is the B$^i$ with maximum P[C|B$^i$].

This ad hoc optimization heuristic starts out with conservative flips and then gradually becomes more aggressive. This is because flipping a pixel tends to inhibit its neighbors from flipping. Hence only the "locally most flippable" pixels are used to qualify in the early rounds. On the other hand, a more sequential approach, such as flipping pixels one at a time starting from the "most flippable" would be unacceptably slow. As a further way to speed up the process, new alignments are not determined after the representative image B$^2$ or determined subsequently. Typically, there is a lot of flipping from the representative image B$^0$ to the representative image B$^1$, and only a little bit of fine tuning-which rarely changes the alignments-in subsequent rounds.

The cluster representative for a large cluster (at least five scans) typically has a noticeably better appearance than a representative for a small cluster. FIG. 10 shows some examples of this. The left section is an input facsimile. The middle section is after one round of flipping pixels to optimize cluster representatives. The right section is after four rounds of flipping. Note the difference between large cluster text (letters i, n and o) and small cluster text (gh and th) in the right hand portion of FIG. 10.

Because the representative for a singleton (one-member) is identical in resolution to the scan, improvement is not attainable. Additionally, "furry" representation may take place where a vertical edge lies halfway between two verticals of the double-resolution pixel. One way to solve such problems is to define Bayesian prior probability distributions on representatives and incorporate them into the overall optimization using equation (5).

Chain codes may be used to determine the a priori distributions. A chain code is a string of letters N, E, S, W, for north, east, south, and west, representing the directions of boundary edges around a representative image. Edges are oriented so that black is on the left, meaning the edges are traversed counterclockwise around the outer boundary and clockwise around holes. Transition probabilities are compiled for all chain codes of length five, meaning the relative frequencies of the next letter after each possible string of length five. An exemplary method of using chain codes is described in U.S. Pat. No. 5,303,313 to Dance, which is incorporated herein by reference in its entirety.

Since boundary edges cannot double back on themselves, there are always three possible choices (straight, turn left or turn right) for each edge after the first. Hence, there is a total of $4 \times 3^5 = 972$ transition probabilities in the table. Turing's rule is used for assigning probabilities to transitions that never occurred. That is, we assume that all non-occurring transitions had the same probability and that altogether they had the same total probability as the once occurring transitions.

The a priori probability P[B$^i$] of a given representative image B$^i$ is defined to be the product of the transition probabilities around all connected components of the boundary of the representative image. This a priori distribution penalizes furry representative images and rewards straight and smoothly curving representative images. The optimal representative image is thus defined to be the representative image B$^i$ with maximum P[C|B$^i$] P[B$^i$]. The pixels on either side of an unlikely turn are marked as especially flippable, meaning that these pixels can be flipped even if the histogram argues against it.

The a priori probability P[B$^i$] is much smaller than P[C|B$^i$] for large clusters, and hence, rarely affects the choice of representative. For clusters with only two or three members, however, the a priori probability has an approximately equal voice in the outcome. For singletons, the a priori probability acts as a mild smoothing operation which improves straight strokes and staircasing along diagonals without rounding serifs.

Two different choices of training sets were used to compile the transition probabilities: the statistics from a clean postscript master, and (in a bootstrap approach) the statistics from the representatives for the large clusters (more than ten members) on the scanned document itself. No significant differences could be discerned between the two choices, even when the postscript master was the clean version of the scanned document.

C. Reclustering:

In exemplary embodiments, clusters are processed by decreasing order of their numbers of members. For each cluster, before representatives are computed, an attempt to merge the cluster with some larger cluster is performed. If cluster i is combined with some large cluster j, where large means more than three members, then the representative image B$_j$ for the cluster j also serves as the representative image $B_i$ for cluster i. If the larger cluster j is itself small, i.e., has no more than three members, however, then the combined cluster representative is redetermined using the members of both clusters. Alternatively, in various exemplary embodiments, merging cluster i with a larger cluster can be stopped when the size of the larger cluster gets down to three. This alternative gives a significant increase in processing speed, sacrificing only a small amount of final image quality.

An exemplary reclustering is performed by using the connected component $A_i$ denoting a single-resolution exemplar for cluster i, the representative image $B_j$ denoting a double-resolution representative for cluster j, and the probability $P[A_i|B_j]$ as given by Eq. (3). In order to compare $P[A_i|B_j]$ against a preset threshold, $P[A_i|B_j]$ is normalized to account for the different sizes of connected components:

$$N[A_i|B_j] = (P[A_i|B_j])^{1/p},$$

where p is the number of pixels in the connected component $A_i$ (aligned with the representative image $B_j$) that are within a sensor disk's radius of a black pixel in either the connected component $A_i$ or the representative image $B_j$.

In one exemplary embodiment, a match occurs whenever $N[A_i|B_i]$ exceeds a threshold value. In various exemplary embodiments, the value threshold is 0.70. This threshold intuitively declares a match if the probability that the connected component $A_i$ is a capture of the representative image $B_j$ is at least the probability obtained if each pixel in the connected component $A_i$ is predicted with probability 0.70. A slightly more aggressive threshold of 0.68 is used in the case that a cluster i is a singleton and a cluster j has at least four members. As a practical way to speed up the process, $N[A_i|B_j]$ is not determined if the bounding boxes for the connected component $A_i$ and the representative image $B_j$ differ too much in either width or height. If mergers are continued even when the larger cluster has fewer than four representatives, reclustering also saves some running time.

This reclustering improves output appearance significantly. For example, see FIG. 11 in which the left section is after four rounds of flipping including Bayesian priors. The center section is after reclustering. The right section is after breaking run-together letters. As can be seen from comparing the left and center sections, the m, M, c, te and th have improved after reclustering.

Reclustering can also improve compression performance by 10–30% on scanned and faxed documents, with a smaller percentage typical for flatbed scan and the larger percentage for typical 200 dpi faxes. It has been found that super-resolution is important to reclustering performance. Thus, single-resolution representatives with single-resolution translations find only about 40% of the valid mergers found by the double-resolution algorithm before starting to make mistakes. However, single resolution representatives with double-resolution translations find about ⅔ rds of the valid mergers found by a fully double-resolution algorithm.

For fax inputs, there remain many singleton clusters, even after reclustering. Typically, half of these are run-together letters. In various exemplary embodiments of the invention, an additional step can be added to cope with this problem. In particular, for each singleton cluster, a final pass through its representative image is made, determining a sequence of "breakable positions" that attempt to break possible run-together letters. The "breakable positions" are as follows: a value of 2 is counted for each orthogonal adjacency, and a value of 1 is counted for each diagonal adjacency, between a column c and an adjacent column c+1. The position between the column c and the adjacent column c+1 is breakable if the total adjacency is no greater than 5, the last breakable position was at least 5 columns to the left, and the total number of black pixels 2 and 3 columns to the left and right is sufficiently large (at least 6 on each of left and right). This check avoids breaking a horizontal line at every fifth column. The partial bitmaps are then matched (using the previous matching threshold as before) between successive breakable positions with previous clusters' representative images. If a successful match is found, then the partial bitmap is replaced by the representative of the larger cluster. Otherwise, the partial bitmap is passed along unchanged. FIG. 11 on the right section shows the result of the breaking step, in which of the run-together pairs gh, te and th, gh was successfully broken up and properly matched with letters g and h, respectively.

D. Assembling the Output:

The complete output image data is reassembled, replacing each connected component, or matched piece of a connected component, with its cluster's representative image. The position for the representative image is a most likely position found by first aligning the centers of bounding boxes of each connected component to be replaced and then testing the nine nearby double-resolution translations. All of these alignments may be redetermined, even though most of them were determined at an earlier step.

Various experimental results were conducted showing improvements in output image achieved by these various systems and methods. When compared to prior known techniques, error rates for a similar amount of clusters appears to be lower. Of particular importance to overall quality and reproduction was use of super-resolved base line images and deskewing after super-resolution. To achieve reduced run time with only a slight reduction in image enhancement, it is possible to omit merging singletons with other singletons. Overall, it has been found that the systems and methods improve document images and a practical solution to high-quality scanning needs.

The foregoing description of the exemplary systems and methods for detection of this invention is illustrative, and variations in implementation will be apparent and predictable to persons skilled in the art. For example, while the systems and methods of this invention have been described with reference to desktop-captured images, any other type of image sensing device requiring accurate reconstruction of the underlying image can be used in conjunction with the systems and methods of this invention.

Thus, while the systems and methods of this invention have been described in conjunction with the specific embodiments outlined above, it is evident that many alternatives, modifications and variations will be apparent to those skilled in the art. Accordingly, the exemplary embodiments of the systems and methods of this invention, as set forth above, are intended to be illustrative, not limiting. Various changes may be made without departing from the spirit and scope of the invention.

For example, the methods and systems of this invention may also be useful for archival documents. If originals are no longer available, the methods and systems of this invention could improve the appearance of the existing image captures. Even if the originals are available, it may be more cost-effective to perform high-speed lower quality image captures and subsequently improve the image quality in software.

What is claimed is:

1. A method for improving appearance of captured bilevel image data, comprising:

receiving a degraded input bilevel image;
connecting dark pixels in the input image to adjacent dark pixels to form connected components comprising a set of dark pixels connected either diagonally or orthogonally and surrounded by white pixels;
performing initial clustering of individual connected components;
determining a "most likely" cluster representative by use of a probabilistic model of the scanner used for scanning; and
assembling the sets by substituting the "most-likely" cluster representative for each family member of each cluster set to form an output image,
wherein the step of performing initial clustering includes pair-wise matching connected components and determining a match if the pair are within a certain threshold of matching to form cluster sets, each with one or more family members formed of individual connected components,
the step of determining a "most likely" cluster representative for each cluster set uses a optimization procedure in which at least one iteration of pixel flipping is performed,
multiple iterations of pixel flipping are performed, with a first iteration of pixel flipping being performed with a first threshold, and
a subsequent iteration being performed with a more progressive threshold being applied until a maximized probability is attained.

2. The method of claim 1, wherein the optimization procedure is a hill-climbing optimization procedure.

3. The method of claim 1, wherein an initial representative is determined by finding a translation t of each family member that maximizes the probability that the family member is a given original image to obtain a higher resolution histogram.

4. The method of claim 1, wherein an initial representative is determined by summing scans of each maximized family member to form a double-resolution histogram.

5. The method of claim 1, further comprising a step of reclustering by comparing cluster representatives of clusters.

6. The method of claim 5, wherein the step of reclustering reclusters the cluster sets by comparing cluster representatives of smaller cluster sets with cluster representatives of larger cluster sets and merging the smaller cluster set into the larger cluster set when a normalized probability exceeds a default threshold.

7. The method of claim 5, wherein the step of reclustering is performed by normalizing probabilities using $$N[A_i|B_j] = (P[A_i|B_j])^{1/p},$$

where p is the number of pixels in the connected component $A_i$ (aligned with the representative image $B_j$) that are within a sensor disk's radius of a black pixel in either the connected component $A_i$ or the representative image $B_j$.

8. The method of claim 7, wherein a threshold is 0.70.

9. The method of claim 7, wherein a threshold is 0.68 when a smaller cluster set is a singleton and a larger cluster set has at least four family members.

10. The method of claim 5, wherein reclustering stops when the larger cluster sets have fewer than four family members.

11. The method of claim 1, wherein the initial clustering includes:
forming a bounding box around each connected component A and B;
aligning connected components A and B to each other by aligning centers of their bounding boxes; and
determining a match of the connected components A and B if:

$$|A| - |A \cap \overline{B}| \leq f(|\partial A|) \text{ and } |B| - |B \cap \overline{A}| \leq f(|\partial B|)$$

where:
|A| denotes the number of black pixels in A;
$A \cap B$ denotes the pixels that are black in both A and B;
$\overline{A}$ denotes a one-pixel dilation of the black pixels in A;
$\partial A$ denotes the boundary of A, that is, the set of black pixels with white and
$f(n)$ equals 0 for $n \leq 3$, and 0.025 n for $n \geq 7$, and interpolates between these two lines for $3 < n < 7$.

12. The method of claim 11, wherein stopping of a match of one of or $A \backslash \overline{B}$ or $B \backslash \overline{A}$ includes a set of more than three pixels that can be enclosed by a 3×3 box.

13. The method of claim 11, wherein the probability that a pixel in row i and column j has value $A_{ij}$ (black or white) given B and $\tau$ is determined as:

$$P[A_{ij}|B, \tau] = \begin{cases} p(w_{ij}(\tau)) & \text{if } A_{ij} \text{ is black;} \\ 1 - p(w_{ij}(\tau)) & \text{if } A_{ij} \text{ is white.} \end{cases}$$

where $\tau$ represents a translation of a sensor grid used to capture the input image with respect to a given original image region B;
$w_{ij}(\tau)$ denotes the weight of black in the given original image region B seen by the sensor grid in row i and column j based on a point spread function of the sensor grid; and
$p(w_{ij}(\tau))$ denotes a determined probability that the sensor grid's output pixel would be black.

14. The method of claim 13, wherein individual pixel probabilities within a connected component A are multiplied to obtain a probability $P[A|B,\tau]$ that the connected component A is a capture of the given original image region B at translation $\tau$ as:

$$P[A|B, \tau] = \prod_{ij} P[A_{ij}|B, \tau].$$

15. The method of claim 14, wherein $\tau$ is optimized over all possible translations as $$P[A|B] = \max_{\tau} P[A|B, \tau].$$

16. The method of claim 15, wherein connected component A and given original image region B are prealigned by the centroids of their respective bounding boxes.

17. The method of claim 16, wherein optimization of $\tau$ is limited to the nine shortest vectors in the lattice of the bounding box.

18. The method of claim 15, wherein the probability of an entire cluster set is computed by multiplying the probabilities of each individual family member using $$P[C|B] = \prod_{A \in C} P[A|B]$$

and the initial "most likely" cluster representative is the one that maximizes P[C|B].

19. The method of claim 1, further comprising using chain codes to define a priori probabilities to find the cluster representative.

20. The method of claim 19, wherein the a priori probability is computed by determining the product of transition probabilities around all connected components of the cluster representative to attain a value $B^i$ and the "most likely" representative is the $B^i$ with a maximum $P[C|B^i]$.

21. The method of claim 1, further comprising a step of breaking run-through letters by computing a sequence of breakable positions of singleton cluster representatives and comparing each breakable position portion with other cluster representatives.

22. The method of claim 21, further comprising a step of merging a breakable position portion with a cluster set when the comparison indicates a sufficient match.

23. The method of claim 1, wherein the step of assembly includes aligning centers of bounding boxes and testing double-resolution translations to recompute alignment and determine the most likely position of the cluster representative.

24. A method for improving appearance of captured bilevel image data, comprising:
   receiving a degraded input bilevel image;
   connecting dark pixels in the input image to adjacent dark pixels to form connected components comprising a set of dark pixels connected either diagonally or orthogonally and surrounded by white pixels;
   performing initial clustering of individual connected components;
   determining a "most likely" cluster representative by use of a probabilistic model of the scanner used for scanning;
   assembling the sets by substituting the "most-likely" cluster representative for each family member of each cluster set to form an output image; and
   reclustering by comparing cluster representatives of clusters, wherein
   reclustering stops when the larger cluster sets have fewer than four family members.

25. The method of claim 24, wherein the step of reclustering reclusters the cluster sets by comparing cluster representatives of smaller cluster sets with cluster representatives of larger cluster sets and merging the smaller cluster set into the larger cluster set when a normalized probability exceeds a default threshold.

26. The method of claim 24, wherein the step of reclustering is performed by normalizing probabilities using $$N[A_i|B_j] = (P[A_i|B_j])^{1/p},$$

where p is the number of pixels in the connected component $A_i$ (aligned with the representative image $B_j$) that are within a sensor disk's radius of a black pixel in either the connected component $A_j$, or the representative image $B_j$.

27. The method of claim 26, wherein a threshold is 0.70.

28. The method of claim 26, wherein a threshold is 0.68 when a smaller cluster set is a singleton and a larger cluster set has at least four family members.

29. The method of claim 24, further comprising a step of breaking run-through letters by computing a sequence of breakable positions of singleton cluster representatives and comparing each breakable position portion with other cluster representatives.

30. The method of claim 29, further comprising a step of merging a breakable position portion with a cluster set when the comparison indicates a sufficient match.

* * * * *